(12) United States Patent
Lau

(10) Patent No.: US 6,806,607 B2
(45) Date of Patent: Oct. 19, 2004

(54) ELECTRIC MOTOR

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/321,764

(22) Filed: Dec. 18, 2002

(65) Prior Publication Data

US 2003/0111922 A1 Jun. 19, 2003

(30) Foreign Application Priority Data

Dec. 18, 2001 (GB) .............................................. 0130152

(51) Int. Cl.$^7$ ........................ H02K 21/26; H02K 21/38; H02K 23/04
(52) U.S. Cl. ............................. 310/154.01; 310/154.03; 310/154.06; 310/154.07; 310/154.21; 310/154.28; 310/154.36; 310/254
(58) Field of Search ........................... 310/40 MM, 154, 310/156, 254

(56) References Cited

U.S. PATENT DOCUMENTS

| | | | |
|---|---|---|---|
| 3,083,310 A | 3/1963 | Tweedy et al. | ........ 310/154.18 |
| 4,795,932 A | 1/1989 | Long | ........................ 310/154 |
| 5,109,172 A | 4/1992 | Pace | ........................ 310/154 |
| 5,206,556 A * | 4/1993 | Hayakawa | ............. 310/154.28 |
| 5,619,084 A | 4/1997 | Lau | ............................. 310/154 |

FOREIGN PATENT DOCUMENTS

GB     2191638 A     12/1987     ............ H02K/1/06

OTHER PUBLICATIONS

Patent Abstracts of Japan, vol. 007, No. 258, Nov. 17, 1983 (Japanese Publication No. 58144565, published Aug. 27, 1983).
Patent Abstracts of Japan, vol. 017, No. 535, Sep. 27, 1993 (Japanese Publication No. 05146101, published Jun. 1, 1993.

* cited by examiner

Primary Examiner—Tran Nguyen
Assistant Examiner—J. Aguirrechea
(74) Attorney, Agent, or Firm—Birch, Stewart, Kolasch & Birch, LLP

(57) ABSTRACT

A miniature PMDC motor 10 has a permanent magnet stator comprising two arcuate ceramic magnets 20 fitted to a can-like housing 11 and circumferentially separated by interdisposed rubber magnets 21 wedging or nipping the ceramic magnets 20 in place within the housing 11 without the use of circumferential magnet stops formed in the side of the housing.

5 Claims, 1 Drawing Sheet

ELECTRIC MOTOR

This nonprovisional application claims priority under 35 U.S.C. § 119(a) on Patent Application No. 0130152.2 filed in Great Britain on Dec. 18, 2001, which is herein incorporated by reference.

This invention relates to electric motors and in particular, to miniature electric motors having a permanent magnet stator.

PMDC motors are very common and have many uses and applications. Some applications require motors with a relatively high power with small physical size while some applications require the motor to have low cogging.

Cogging can be reduced by shaping the rotor poles and/or the stator poles. As the stator is a permanent magnet, the shaping of the stator poles means shaping the magnets or the magnetic field which can be shaped during the charging of the magnets. This is usually only possible with ring magnets but ceramic ring magnets are very expensive and rubber ring magnets are not as strong.

When using ceramic magnets, it is usual to use two arcuate ceramic magnets which are circumferentially located with respect to the can-like housing by stops which engage one longitudinal side of each magnet and one or more springs located between and bearing against the other longitudinal edge of the magnets, pressing the magnets into contact with the stops.

A similar arrangement is used with four arcuate magnets and two steps of stops.

Once installed in the housing, the magnets are charged. However, the gap between the ceramic magnets represents a gap in the magnetic field of the stator and any shaping of the magnetic field must take this gap into consideration.

The rubber ring magnet, on the other hand, requires no springs and no stops pressed into the wall of the housing. The magnet is held in place by the magnet itself which expands when it is charged resulting in a housing without side openings. However, there is a need for a housing without side openings which supports a more powerful magnet such as a ceramic magnet.

Accordingly, the present invention provides a permanent magnet motor having a cylindrical housing containing a permanent magnet stator and a wound rotor, wherein the permanent magnet stator comprises at least two arcuate ceramic magnets circumferentially spaced by rubber magnets. The present invention also provides a method of making such a motor.

BRIEF DESCRIPTION OF THE DRAWINGS

One preferred embodiment will now be described, by way of example only, with reference to the accompanying drawings, in which.

DETAILED DESCRIPTION OF THE PREFERRED EMBODIMENT

Figure 1:
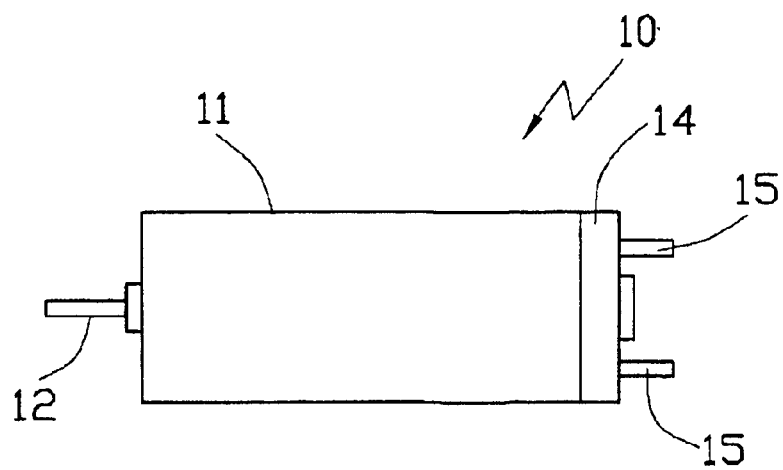
FIG. 1 illustrates a permanent magnet direct current electric motor according to the preferred embodiment of the present invention.

The motor shown in FIG. 1 is a miniature PMDC motor 10 having a two pole permanent magnet stator. The stator comprises a cylindrical can-like housing 11 surrounding the permanent magnets and accommodating a wound rotor of which only a shaft 12 is visible. One end is closed by a molded resin end cap 14 which supports motor terminals 15, brush gear and a bearing. The other end of the housing 11 also supports a bearing for the rotor shaft 12. Although shown as having one open end and one closed end, the housing could have two open ends, both of which are closed by separate end caps.

Figure 2:
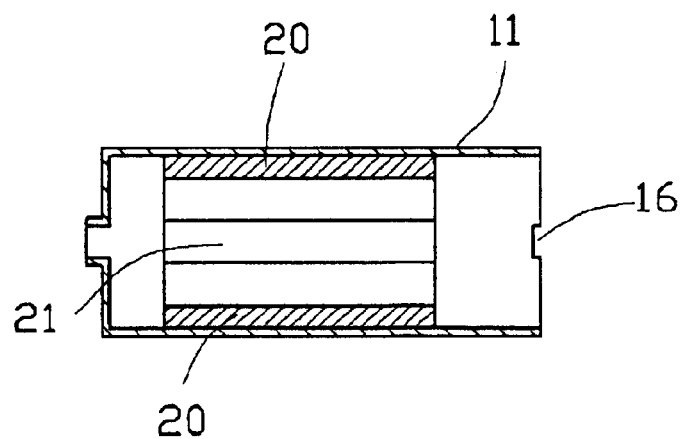
FIG. 2 is a longitudinal cross-section of the stator of the motor of FIG. 1.
Figure 3:
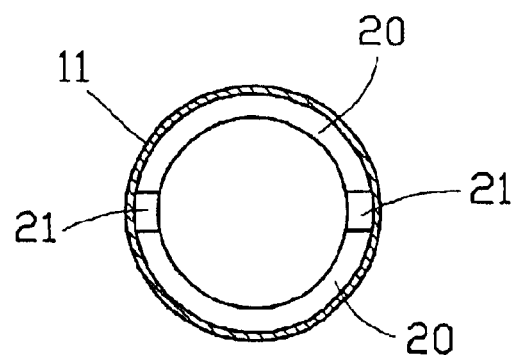
FIG. 3 is a transverse cross-sectional view of the stator of FIG. 2.

The stator, more clearly shown in FIGS. 2 and 3, has two ceramic arcuate magnets 20 placed inside the housing 11. There are no stops formed in the housing to locate the magnets 20 circumferentially with respect to the housing 11. A rubber magnet 21 is pressed into each gap between adjacent longitudinal edges of the ceramic magnets 20. The rubber magnets 21 can be compressed to aid assembly but once charged, the rubber magnets 21 swell, creating a firm interference fit between the ceramic magnets 20 and the rubber magnets 21 fixing the magnets 20, 21 to the housing 11.

The ceramic magnets 20 may be additionally supported by gluing the magnets to the housing 11. The housing 11 may have a notch 16 at one end for aligning the magnets 20, 21 within the housing 11 during assembly and subsequently, for aligning the end cap 14 with the housing 11 so that the brushes are correctly aligned with the magnets to ensure the correct commutation angle.

Although a two pole stator has been shown in the example, the inventive concept can be applied to permanent magnet stators generally having two or more poles and is particularly suited to four pole stators.

The motor thus constructed has a stator with a continuous magnetic field similar to that provided by a ring magnet but with higher energy ceramic magnets at the pole centres and rubber magnets at the interface between the poles allowing shape charging of the stator. This method also allows for the simple fixing of arcuate ceramic magnets to a motor housing and avoids the use of housing deforming magnet stop wings punched into the side of the housing.

The embodiment described above is given by way of example only and various modifications will be apparent to persons skilled in the art without departing from the scope of the invention as defined in the appended claims.

What is claimed is:

1. A miniature electric motor comprising:

a wound rotor;

a permanent magnet stator disposed about the rotor;

a housing supporting the permanent magnet stator;

wherein the permanent magnet stator comprises at least two arcuate ceramic magnets separated circumferentially by rubber magnets.

2. The motor of claim 1 wherein the ceramic magnets are located at the poles of the stator.

3. The motor of claim 1 wherein the rubber magnets have a magnetic charge profile in which the magnetic field varies across the rubber magnets.

4. The motor of claim 1 wherein the ceramic magnets are glued to the housing.

5. The miniature electric motor of claim 1 wherein the housing has no holes in a circumferential wall supporting the magnets.

* * * * *